United States Patent Office 2,946,715
Patented July 26, 1960

2,946,715
INSECTICIDAL COMPOSITION CONTAINING A SULFINAMIDE AND ALLETHRIN OR PYRETHRUM

Roy E. Stansbury and Rector P. Louthan, Bartlesville, Okla., assignors to Phillips Petroleum Company, a corporation of Delaware No Drawing. Filed June 23, 1958, Ser. No. 743,973

15 Claims. (Cl. 167—22)

This invention relates to insecticides containing a sulfinamide and allethrin or pyrethrum. In a more specific aspect the invention relates to an insecticidal composition of this description which has an unexpectedly high paralytic knockdown. In another aspect the invention relates to a method for killing insects.

Pyrethrum or allethrin-containing insecticide mixtures are widely used to control flies, roaches and other household insects. Normally, these compositions contain an insecticide such as DDT, and they also contain pyrethum or allethrin to irritate and activate the insect, thus causing a more rapid kill. Pyrethrum and allethrin also act as "knockdown" agents. A knockdown agent acts to rapidly cause the fly to lie on the floor of a room, thus indicating to the one using the spray that this material is very effective. Moreover, the insecticide can be more efficiently contacted with the insect since it cannot escape while paralyzed. Two forms of "knockdown" are known, one of which is referred to as conventional knockdown, and the other of which is known as paralytic knockdown. Conventional knockdown is indicated by the fly being down on the floor, but still moving about, while when paralytic knockdown is effected, the flies or other insects are completely paralyzed.

It has now been discovered that the rate of conventional knockdown and paralytic knockdown of a pyrethum or allethrin-containing insecticidal composition can be increased by adding thereto an amount of a compound of the formula

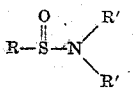

wherein R and R′ are hydrocarbon radicals selected from the group consisting of aromatic, saturated acrylic and saturated alicyclic radicals, and combinations of such radicals (e.g., alkaryl, cycloalkyl alkyl, etc.); wherein R contains from 1 to 16 carbon atoms, inclusive, each R′ contains from 1 to 10 carbon atoms inclusive, the total carbons in R plus the R′ not to exceed 25, and wherein the R′ can be alike or different.

The paralytic knockdown of the insecticidal compositions of the invention displays a very unexpected and high degree of synergism. That is, as shown by test runs, the paralytic knockdown of each of the ingredients of the composition individually is either very low or nil, while the paralytic knockdown of a combination of one of the sulfinamides of the invention plus pyrethrum or allethrin is very high.

Some examples of compounds of the above general formula which can be employed in insecticidal-compositions as set forth herein are:

N,N-dimethylmethanesulfinamide,
N,N-di-n-propyl-2-(2-methylpropane)sulfinamide,
N,N-di-n-decyl-n-pentanesulfinamide,
N-methyl-N-ethyl-2-(2,4-dimethylhexane)sulfinamide,
N,N-di-n-butyl-2-(2,3,4-trimethylpentane)sulfinamide,
N,N-di-n-butylmethanesulfinamide,
N,N-diphenyl-n-decanesulfinamide,
N,N-di-p-tolylcyclohexanesulfinamide,
N,N-dicyclohexyl-2-phenylethanesulfinamide,
N,N-dibenzyl-4-methylbenzenesulfinamide,
N,N-diethyl-2-(2,3-dimethylbutane)sulfinamide,
N - methyl - N - isopropyl-2,4-di-n-propyl-6-n-butylcyclohexanesulfinamide,
N,N-di-n-butyl-2,3-diphenylbutanesulfinamide,
N,N-di-n-propyl-2-(2,5-dimethylheptane)sulfinamide,
N,N-dibenzyl-4-n-pentylcyclohexanesulfinamide,
N,N - diisopropyl-2-(2,3,4,4,5-pentamethylheptane)sulfinamide,
N,N-diethyl-n-hexadecanesulfinamide and
N,N-di(2-ethylphenyl)-4-n-propylcyclohexanesulfinamide.

The insecticidal composition usually contains a ratio of the sulfinamide to the pyrethrum or allethrin between 2.5:1 and 150:1, more often between 5:1 and 25:1 on a weight basis.

The composition of the invention containing the sulfinamide and pyrethrum or allethrin is usually employed with a diluent in accordance with the ordinary practice in this field. Thus, the composition can be spread over the surface of a finely divided powder such as talc, it can be present as a dispersion or emulsion in water, or it can be used as a spray or aerosol. Usually, the compositions are dissolved in a solvent which is generally a hydrocarbon. Solvents are most generally used because allethrin and pyrethrum are solids at ordinary temperatures. Some examples of suitable solvents are deodorized kerosene, diesel fuel, isooctane, and isoparaffinic hydrocarbon mixtures boiling between 260 and 800° F., prepared by alkylation of paraffins with olefins in the presence of hydrofluoric acid.

When the composition of the invention is employed with such a solid or liquid diluent, the defined sulfinamide is usually present in the insecticidal composition in the range between 0.25 and 10 percent by weight, more often between 0.5 and 5.0 percent by weight.

The insecticide compositions of this invention can also contain a third toxicant. Some examples of suitable toxicants are 1,1,1-trichloro-2,2 - bis(p - chlorophenyl) ethane (DDT), 2,3,4,5,6,7,8,8-octachloro-4,7-methano-3a,4,7,7a - tetrahydroindane(chlordane), 1,2,3,4,10,10- hexachloro - 6,7-epoxy-1,4,4a,5,6,7,8,8a-octahydro-1,4,5, 8-dimethanonaphthalene (dieldrin) and the like. Some examples of other insecticides which can be used are lindane, toxaphene, endrin, and other insecticides known to the trade.

If a third toxicant material is employed, this third toxicant material will usually be employed in the range between 0.5 to 75 parts by weight of toxicant per part by weight of pyrethrum or allethrin.

Sulfinamides of the formula

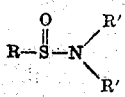

as defined herein can be prepared by chlorinating a solution of the corresponding mercaptan of the formula RSH in solution in a hydrocarbon. The reaction between the chlorine and the mercaptan is equimolar, and this reaction results in the formation of the corresponding sulfenyl chloride. An equimolar amount of the sulfenyl chloride is charged to an aqueous caustic solution of the secondary amine of formula

thus forming the corresponding N-substituted sulfenamide, after which the hydrocarbon and aqueous phases are separated. The sulfenamide is then recovered from solution by distilling off the solvent under vacuum. The sulfenamide is then dissolved in methyl alcohol, usually using about 250–300 mls. of the alcohol per mole of the sulfenamide. After this solution is formed, an equimolar amount of aqueous hydrogen peroxide is charged, and this oxidation is carried out at approximately room temperature. However, the initial addition of peroxide causes a rapid evolution of heat, and it is advantageous to remove this heat by such means as a reflux condenser. This oxidation step produces the corresponding sulfinamide, and the sulfinamide is recovered by distilling off the methyl alcohol, adding a hydrocarbon to the mixture, and separating the organic and aqueous phases. The sulfinamide is recovered in the organic phase, and it is advantageous to remove the solvent from the sulfinamide by vacuum distillation.

The sulfinamides of this invention in which the alkyl group which is attached to the sulfur atom is a primary or secondary alkyl group can also be prepared by reacting a hydrocarbon solution of the desired mercaptan with chlorine in the ratio of three moles of chlorine to two moles of mercaptan to form the corresponding alkylsulfur trichlorides. These alkylsulfur trichlorides are then reacted with either water, alcohol or a mixture of the two to form the alkanesulfinyl chlorides. In this step, excess water and/or alcohol is avoided. After the alkanesulfinyl chlorides are formed, they are reacted with the desired secondary amine in equimolar quantities to form the desired alkanesulfinamide.

The following procedure was employed to prepare the N,N-di-n-butyl-tert-octanesulfinamide which was employed in Example I hereafter:

One hundred fifty-three grams of tert-octyl mercaptan and 750 milliliters of normal heptane were charged to a flask, and 71 grams of chlorine were bubbled in at the reflux temperature of the heptane. One hundred twenty-nine grams of di-n-butylamine was then charged to the resulting solution, and it was noticed that a solid material was formed in the flask. One hundred grams of a 40% by weight aqueous sodium hydroxide solution was then added to the flask, and the hydrocarbon phase was then separated from the aqueous phase. The organic phase was washed with water, the n-heptane was stripped off and the remaining portion of the organic phase was distilled at reduced temperature. The yield of N,N-di-n-butyl-tert-octylsulfenamide was 101.7 grams, boiling from 101.5 to 106.5 at 0.5 mm. mercury absolute pressure.

Ninety-eight grams of the above prepared sulfenamide and 110 milliliters of methanol were admixed and heated to reflux temperature, after which there was added 30.6 grams of 30% by weight aqueous hydrogen peroxide. The solution refluxed vigorously upon addition of the peroxide. The resulting solution was allowed to stand overnight, after which most of the methyl alcohol was stripped off by heating. Seven hundred fifty milliliters of normal pentane was then added to the mixture, after which the organic and aqueous phase were separated. The organic phase was then washed with water and the normal pentane was removed by fractionation at 60° C. and 1 mm. mercury absolute pressure. The remaining material, N,N-di-n-butyl-tert-octanesulfinamide, amounted to 101.3 grams. This material was a viscous, colorless oil having a refractive index at 20° C. of 1.4741. An elemental analysis of this material was made, and the following results were obtained.

*Analysis*

| Element | Calculated | Found |
| --- | --- | --- |
| C | 66.4 | 66.4 |
| H | 12.1 | 12.3 |
| N | 4.8 | 5.0 |
| S | 11.1 | 11.02 |
| O | 5.6 | 5.28 (by difference). |

EXAMPLE I

A number of compounds falling within the scopes of the general formula shown above were tested for insecticidal activity both alone and in admixture with either allethrins or pyrethrum.

In these tests an amount of the chemical to be tested was dissolved in 12 cc. (sp. gr.—0.81) deodorized kerosene (Apco 467), and this solution was sprayed into a Peet-Grady chamber in which a known number of houseflies were contained. The Peet-Grady chamber is a chamber of 216 cubic feet capacity (6' x 6' x 6'). The number of flies knocked down, e.g., paralyzed or dead, was counted at various time intervals and the total number of flies that were dead at the end of 24 hours was counted. The results of these tests are expressed below as Table I. In Table I, an estimate of paralytic knockdown is given for each run. Paralytic knockdown is distinguished from total knockdown in that total knockdown includes both the flies actually paralyzed and those down, but moving about on the floor of the chamber.

*Table I*

| Run No. | | Grams of Sulfinamide Used | Grams of Allethrin Used | Grams of Pyrethrum Used | Total Knockdown After 10 Minutes, Percent | Observed Paralytic Knockdown | 24 Hour Kill, Percent |
| --- | --- | --- | --- | --- | --- | --- | --- |
| 1 | | 0 | 0.006 | 0 | 85 | Approx. 15% paralyzed | 21 |
| 2 | | 0 | | 0.0012 | 76 | None paralyzed | 16 |
| 3 | N,N-di-n-butylmethanesulfinamide | 0.12 | 0 | 0 | 57 | do | 12 |
| 4 [1] | do | 0.06 | 0 | 0 | 49 | Approx. 1% paralyzed | 24 |
| 5 | N,N-di-n-butyl-tert-octanesulfinamide | 0.06 | 0 | 0 | 56 | 1% paralyzed | 17 |
| 6 | N,N-di-n-butylmethanesulfinamide | 0.12 | 0.006 | 0 | 99 | Essentially all paralyzed | 38 |
| 7 | do | 0.06 | 0.006 | 0 | 98 | 97% paralyzed | 47 |
| 8 | do | 0.03 | 0.006 | 0 | 95 | Not observed | 36 |
| 9 | do | 0.012 | 0 | .0012 | 95 | 73% paralyzed | 21 |
| 10 | N,N-di-n-butyl-tert-octanesulfinamide | 0.06 | 0.006 | 0 | 97 | 70% paralyzed | 56 |

[1] Average of two runs.

EXAMPLE II

A formulation is made up comprising 0.05 weight percent allethrins, 1.0 weight percent N,N-di-n-butylmethanesulfinamide, 2.0 weight percent DDT (1,1,1-trichloro-2,2-bis(p-chlorophenyl)ethane) and 96.95 weight percent deodorized kerosene. This formulation is then sprayed into a closed space in which house flies are confined. All of the flies present are knocked down, approximately 98 percent of those down are paralyzed, and, after 24 hours, all of the flies are dead.

As will be evident to those skilled in the art, various modifications of this invention can be made or followed in the light of the foregoing disclosure and discussion without departing from the spirit or scope of the disclosure or from the scope of the claims.

We claim:

1. An insecticidal composition containing a sulfinamide and a pyrethrum-like compound in a ratio in the range from 2.5:1 to 150:1 on a weight basis, wherein said sulfinamide has the formula

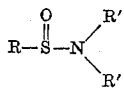

wherein R and R' are hydrocarbon radicals selected from the group consisting of aryl, saturated acyclic and saturated alicyclic radicals and combinations of such radicals, each R contains from 1 to 16 carbon atoms, each R' contains from 1 to 10 carbon atoms, and the total carbon atoms in R plus the R's does not exceed 25, and wherein the said pyrethrum-like compound is selected from the group consisting of pyrethrum and allethrin.

2. An insecticidal composition containing a sulfinamide and a pyrethrum-like compound in a ratio in the range from 5:1 to 25:1 on a weight basis, wherein said sulfinamide has the formula

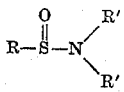

wherein R and R' are hydrocarbon radicals selected from the group consisting of aryl, saturated acyclic and saturated alicyclic radicals and combinations of such radicals, each R contains from 1 to 16 carbon atoms, each R' contains from 1 to 10 carbon atoms, and the total carbon atoms in R plus the R's does not exceed 25, and wherein the said pyrethrum-like compound is selected from the group consisting of pyrethrum and allethrin.

3. An insecticidal composition containing (1) a sulfinamide and (2) pyrethrum-like compound in a ratio in the range from 2.5:1 to 150:1 on a weight basis, wherein said sulfinamide has the formula

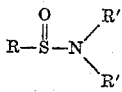

wherein R and R' are hydrocarbon radicals selected from the group consisting of aryl, saturated acyclic and saturated alicyclic radicals and combinations of such radicals, each R contains from 1 to 16 carbon atoms, each R' contains from 1 to 10 carbon atoms, and the total carbon atoms in R plus the R's does not exceed 25, and wherein the said pyrethrum-like compound is selected from the group consisting of pyrethrum and allethrin; said insecticidal composition containing (3) another insecticidal compound.

4. An insecticidal composition containing a sulfinamide and a pyrethrum-like compound in a ratio of the former to the latter in the range from 2.5:1 to 150:1 on a weight basis, wherein said sulfinamide has the formula

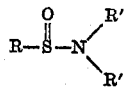

wherein R and R' are hydrocarbon radicals selected from to 16 carbon atoms, each R' contains from 1 to 10 carbon atoms, and the total carbon atoms in R plus the R's does not exceed 25, and wherein the said pyrethrum-like compound is selected from the group consisting of pyrethrum and allethrin.

5. A composition of claim 1 wherein said sulfinamide is a N,N-di-n-butylmethanesulfinamide.

6. A composition of claim 1 wherein said sulfinamide is a N,N-di-n-butyl-tert-octanesulfinamide.

7. A composition of claim 5 wherein said pyrethrum-like compound is pyrethrum.

8. A composition of claim 5 wherein said pyrethrum-like compound is allethrin.

9. A composition of claim 6 wherein said pyrethrum-like compound is allethrin.

10. A composition of claim 3 wherein said third component is 1,1,1-trichloro-2,2-bis(p-chlorophenyl)ethane.

11. A method of paralyzing and killing insects which comprises exposing such insects to the action of an insecticidal composition containing a sulfinamide and a pyrethrum-like compound in a ratio in the range from 2.5:1 to 150:1 on a weight basis, wherein said sulfinamide has the formula

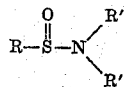

wherein R and R' are hydrocarbon radicals selected from the group consisting of aryl, saturated acyclic and saturated alicyclic radicals and combinations of such radicals, each R contains from 1 to 16 carbon atoms, each R' contains from 1 to 10 carbon atoms, and the total carbon atoms in R plus the R's does not exceed 25, and wherein the said pyrethrum-like compound is selected from the group consisting of pyrethrum and allethrin.

12. The method according to claim 11 wherein said sulfinamide is N,N-di-n-butyl-tert-octanesulfinamide, and said pyrethrum-like compound is allethrin.

13. The method according to claim 11 wherein said sulfinamide is N,N-di-n-butylmethanesulfinamide, and said pyrethrum-like compound is allethrin.

14. The method according to claim 12 wherein said insecticidal composition contains as a third component 1,1,1 - trichloro - 2,2 - bis(p - chlorophenyl)ethane in an amount in the range between 0.5 to 75 parts by weight per part by weight of said allethrin.

15. The method according to claim 11 wherein said sulfinamide is N,N-di-n-butylmethanesulfinamide, and said pyrethrin-like compound is pyrethrin.

References Cited in the file of this patent

Sumerford: Jour. Agr. Food Chem., vol. 2, No. 6, pp. 310–327.

UNITED STATES PATENT OFFICE
CERTIFICATE OF CORRECTION

Patent No. 2,946,715            July 26, 1960

Roy E. Stansbury et al.

It is hereby certified that error appears in the printed specification of the above numbered patent requiring correction and that the said Letters Patent should read as corrected below.

Column 6, lines 1 and 2, for "hydrocarbon radicals selected from 1 to 16 carbon atoms" read -- alkyl groups containing from 1 to 16 carbon atoms --.

Signed and sealed this 4th day of April 1961.

(SEAL)
Attest: ERNEST W. SWIDER

Attesting Officer

ARTHUR W. CROCKER
Acting Commissioner of Patents